United States Patent
Yada et al.

(10) Patent No.: US 9,109,736 B2
(45) Date of Patent: Aug. 18, 2015

(54) FLUID RESISTANCE DEVICE

(71) Applicant: HORIBA STEC, Co., Ltd., Kyoto-shi, Kyoto (JP)

(72) Inventors: Hidetaka Yada, Kyoto (JP); Takehisa Hataita, Kyoto (JP); Soutaro Kishida, Kyoto (JP)

(73) Assignee: HORIBA STEC, Co. Ltd., Kyoto (JP)

( * ) Notice: Subject to any disclaimer, the term of this patent is extended or adjusted under 35 U.S.C. 154(b) by 91 days.

(21) Appl. No.: 13/748,506

(22) Filed: Jan. 23, 2013

(65) Prior Publication Data

US 2013/0186499 A1 Jul. 25, 2013

(30) Foreign Application Priority Data

Jan. 24, 2012 (JP) .................... 2012-012050

(51) Int. Cl.
- G05D 7/01 (2006.01)
- F16L 55/027 (2006.01)
- G01F 1/34 (2006.01)

(52) U.S. Cl.
CPC .............. *F16L 55/027* (2013.01); *G01F 1/34* (2013.01)

(58) Field of Classification Search
CPC ............ G01F 1/48; G01F 1/34; F28F 21/065; F28F 2210/06; F28F 2275/08; F28F 2275/085; F28F 2275/10; F28F 2275/12; F28F 2275/122; F28F 2275/16; F28F 2275/18
USPC ............ 138/40, 42, 43, 44, 45, 159; 422/502, 422/503, 504
See application file for complete search history.

(56) References Cited

U.S. PATENT DOCUMENTS

| | | | |
|---|---|---|---|
| 3,779,076 A | 12/1973 | Akeley | |
| 5,181,562 A * | 1/1993 | Kuriki | 165/166 |
| 5,775,410 A * | 7/1998 | Ramm-Schmidt et al. | 165/110 |
| 7,819,175 B2 * | 10/2010 | Zoodsma | 165/104.33 |
| 8,302,408 B2 * | 11/2012 | Miki | 62/3.3 |
| 8,356,633 B2 * | 1/2013 | Hashimoto et al. | 138/42 |
| 2003/0180190 A1 * | 9/2003 | Corcoran et al. | 422/102 |

(Continued)

FOREIGN PATENT DOCUMENTS

| | | |
|---|---|---|
| GB | 1165723 A | 10/1969 |
| JP | 52160810 U | 12/1977 |

(Continued)

OTHER PUBLICATIONS

Japanese Patent Office, Office Action issued in JP Application No. 2012-012050, Jul. 1, 2014, 6 pages.

(Continued)

*Primary Examiner* — J. Casimer Jacyna
*Assistant Examiner* — Benjamin R Shaw
(74) *Attorney, Agent, or Firm* — Alleman Hall McCoy Russell & Tuttle LLP

(57) ABSTRACT

In order to provide a fluid resistance device that is easily manufactured, compact, accurate, and uniform in performance, the fluid resistance device comprises two members that have facing surfaces that face each other and a downstream end of the upstream side flow channel and an upstream end of the downstream side flow channel open at positions displaced from each other on the facing surfaces, and a ring body that is arranged to surround the downstream end opening and the upstream end opening and that forms the fluid resistance channel between the downstream end opening and the upstream end opening by being sandwiched by the facing surfaces, and is so configured that the ring body is made of a material harder than that of each member, and the ring body breaks into the facing surfaces by fastening two members so as to make the facing surfaces approach each other.

7 Claims, 11 Drawing Sheets

(56) References Cited

U.S. PATENT DOCUMENTS

| | | | |
|---|---|---|---|
| 2004/0258572 A1* | 12/2004 | Haibara et al. | 422/100 |
| 2009/0078329 A1* | 3/2009 | Minegishi et al. | 138/177 |
| 2012/0275972 A1* | 11/2012 | Schoen et al. | 422/503 |

FOREIGN PATENT DOCUMENTS

| | | | |
|---|---|---|---|
| JP | 09144886 A | 6/1997 |
| JP | 2004052900 A | 2/2004 |
| JP | 2009505011 A | 2/2009 |
| JP | 2009204626 A | 9/2009 |
| JP | 2010522851 A | 7/2010 |

OTHER PUBLICATIONS

Japanese Patent Office, Notice of Allowance Issued in Japanese Patent Application No. 2012-012050, Feb. 17, 2015, 3 pp.

* cited by examiner

FIG. 5A
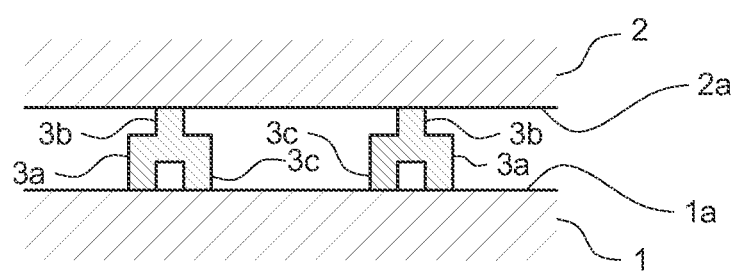
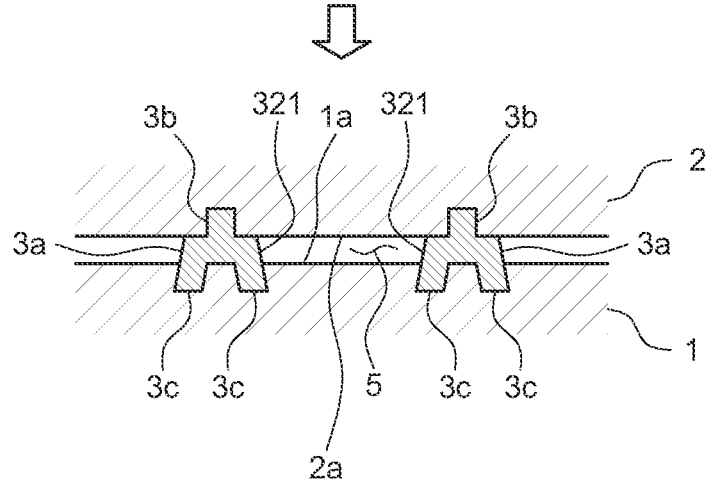
FIG. 5B

FLUID RESISTANCE DEVICE

FIELD OF THE ART

This invention relates to a fluid resistance device that is for producing, for example, a differential pressure and that is used for measuring a flow rate.

BACKGROUND ART

A differential pressure type flow rate measuring device or a differential pressure type flow rate control device uses a fluid resistance device for producing a differential pressure. Example fluid resistance devices include an orifice member formed by opening a fine pore on a plate material and a capillary member formed by a metal fine canal.

Meanwhile, whether the orifice member is used or the capillary member is used is selected appropriately depending on a flow rate or a viscosity of a fluid. When focusing attention on the capillary member, as shown in FIG. 1 and FIG. 2 in the patent document 1, conventionally the capillary member is so configured that a metal fine canal is connected by being welded to a fluid flow channel formed in a block body or the like.

PRIOR ART DOCUMENT

Patent Document

Patent document 1 Japanese Unexamined Patent Application Publication NO. 2009-204626

DISCLOSURE OF THE INVENTION

Problems to be Solved by the Invention

However, since the welding operation requires a great deal of works and technical capabilities, there is a problem that a cost is increased. In addition, in case of increasing the fluid resistance, if the metal fine canal is made thin, the welding operation becomes more difficult. Then there is no other choice but to elongate the metal fine canal, resulting in a problem that it becomes difficult to downsize the device. Furthermore, since it is necessary to make a size of the capillary member within a certain degree, there is also a process of bending the metal fine canal. Since a fluid resistance value changes due to slight changes in an internal diameter during the process of bending the metal fine canal, it is difficult to make the performance of the product uniform.

The present claimed invention is based on a totally new idea that the fluid resistance channel is formed by making use of a seal member, and a main object of this invention is to provide a fluid resistance device that can be manufactured with ease, that can be downsized, and that can contribute to homogenization of the performance or improvement of the accuracy.

Means to Solve the Problems

More specifically, the fluid resistance device in accordance with this invention is the fluid resistance device where an upstream side flow channel, a downstream side flow channel and a fluid resistance channel that connects these flow channels are formed, comprising two members that have facing surfaces that face each other and a downstream end of the upstream side flow channel and an upstream end of the downstream side flow channel open at positions displaced from each other on the facing surfaces, and a ring body that is arranged to surround the downstream end opening and the upstream end opening and that forms the fluid resistance channel between the downstream end opening and the upstream end opening by being sandwiched by the facing surfaces, wherein the ring body is made of a material harder than that of each member, and the ring body is so configured to break into the facing surfaces by fastening two members so as to make the facing surfaces approach each other.

In accordance with this arrangement, it is possible to form the fluid resistance channel surrounded by the inner circumferential edge of the ring body and the facing surfaces just by placing the ring body that is previously made by, for example, a die forming on a predetermined position of the facing surface of one of the members and mounting the other member on the ring body. As a result of this, it is possible to manufacture the fluid resistance device extremely easily without complicated work such as welding.

In addition, since the measurement accuracy of the fluid resistance channel can be improved with ease, it is possible to improve the fluid resistance device by having less variation in the performance.

Furthermore, since the ring body that forms the fluid resistance channel also serves to function as a seal member by breaking into the facing surface of each member, it is possible to reduce a number of components.

In addition, if the members are used in common and only a type of the ring body to break into the members is changed, it is possible to manufacture the fluid resistance device having various fluid resistance characteristics easily so that a product lineup can be assorted with ease.

In order to simplify a structure of the other member, the upstream side flow channel and the downstream side flow channel are formed only on one of the members; it is preferable that both the downstream end opening and the upstream end opening are formed on the facing surface of one of the members.

As a concrete mode for forming a capillary, represented is that a parallel elongating part is formed wherein inside edge parts of the ring body that face each other elongate in parallel while keeping an equal distance, and the fluid resistance channel whose length is long enough compared with a transverse cross sectional area is formed on the parallel elongating part between the downstream end opening and the upstream end opening.

If the ring body comprises a center member, a first projecting part that projects from a part of a surface facing one of the facing surfaces on the center member, and a second projecting part that projects from a part of a surface facing the other facing surface on the center member, since the center part of the ring body rarely breaks into the facing surface because the center part is wider than each of the projecting parts, a gap is formed between the facing surfaces accurately by a length generally the same as the height of the center part. As a result of this, it is possible to reproduce the shape and the size of the fluid resistance channel with high accuracy so a fluid resistance device having less dispersion of performance can be provided.

Concretely, it can be represented that the first projecting part projects from an inner end part of the center member and the second projecting part projects from an outer end part of the center member. In accordance with this arrangement, since the projecting parts break into the facing surfaces at an angle while the ring body slightly rotates as viewed from the transversal cross-sectional surface direction, a stress is produced at a position where the projecting parts break into a vertical direction and a lateral direction, which enables sealing more securely.

The first projecting part may project from a center part of the center member and a pair of the second projecting parts may project from an inner end part and an outer end part of the center member respectively.

In addition, the present claimed invention is a fluid resistance device where an upstream side flow channel, a downstream side flow channel and a fluid resistance channel that connects these flow channels are formed, and which comprises two members that have facing surfaces that face each other and a downstream end of the upstream side flow channel and an upstream end of the downstream side flow channel open at positions displaced from each other on the facing surfaces, and a ring body that is arranged to surround the downstream end opening and the upstream end opening and that forms the fluid resistance channel between the downstream end opening and the upstream end opening by being sandwiched by the facing surfaces, wherein each member is made of a material harder than that of the ring body, and the facing surfaces are so configured to break into the ring body by fastening two members so as to make the facing surfaces approach each other.

In this case, as a concrete arrangement to enable a more secure seal, it is preferable that a ring-shaped projection is formed for each of the facing surfaces and each projection is configured to break into a front surface and a back surface of the ring body.

Effect of the Invention

In accordance with the invention having the above-mentioned arrangement, since the ring body serves as both the seal member and a member to form the fluid resistance channel, it is possible to manufacture the fluid resistance device with ease, to downsize the fluid resistance device and to reduce a number of components. Furthermore, this invention can contribute to uniform performance and improvement of accuracy.

BRIEF DESCRIPTION OF THE DRAWINGS

FIGS. 5A and 5B show explanatory views to explain an assembling procedure of the fluid resistance device viewed from a cross-sectional surface in accordance with this embodiment.

BEST MODES OF EMBODYING THE INVENTION

A fluid resistance device 100 in accordance with this embodiment will be explained with reference to drawings.

Figure 1:
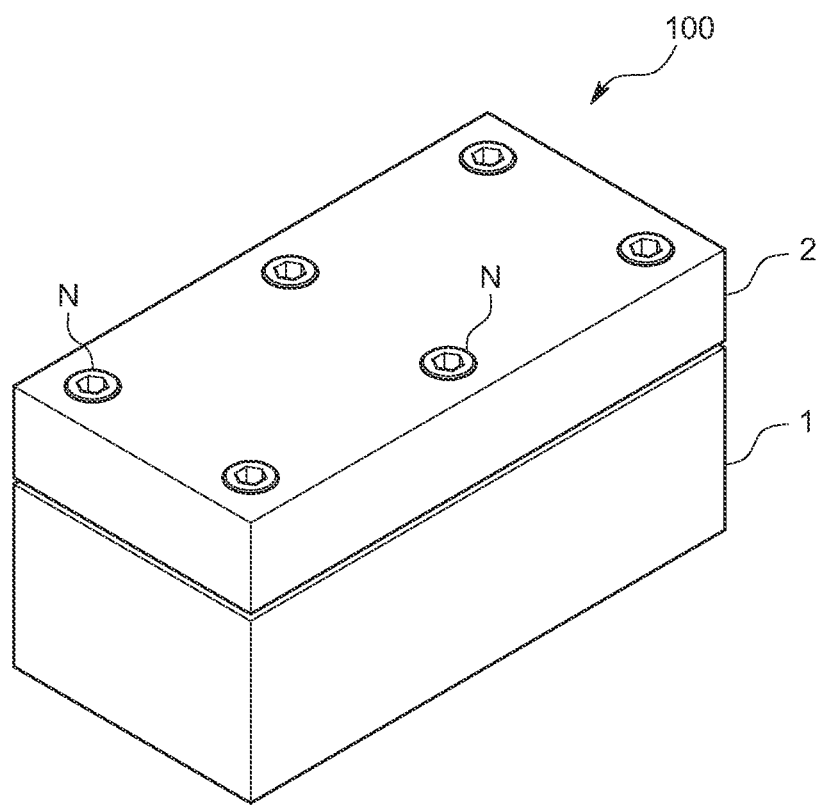
FIG. 1 is a pattern diagram of a fluid resistance device in accordance with one embodiment of this invention.

The fluid resistance device 100 constitutes a part of, for example, a flow rate control device, namely, a part (concretely, a part to measure a flow rate of a fluid smaller than or equal to 3 cc/min) that measures pressures downstream and upstream of the fluid resistance device 100 and measures the flow rate, and is in a shape of a cuboid block as a whole as shown in FIG. 1, and inside of which are formed an upstream side flow channel (not shown in drawings), a downstream side flow channel (not shown in drawings) and a fluid resistance channel 5 (refer to FIG. 2), in each of which a fluid flows.

Figure 2:
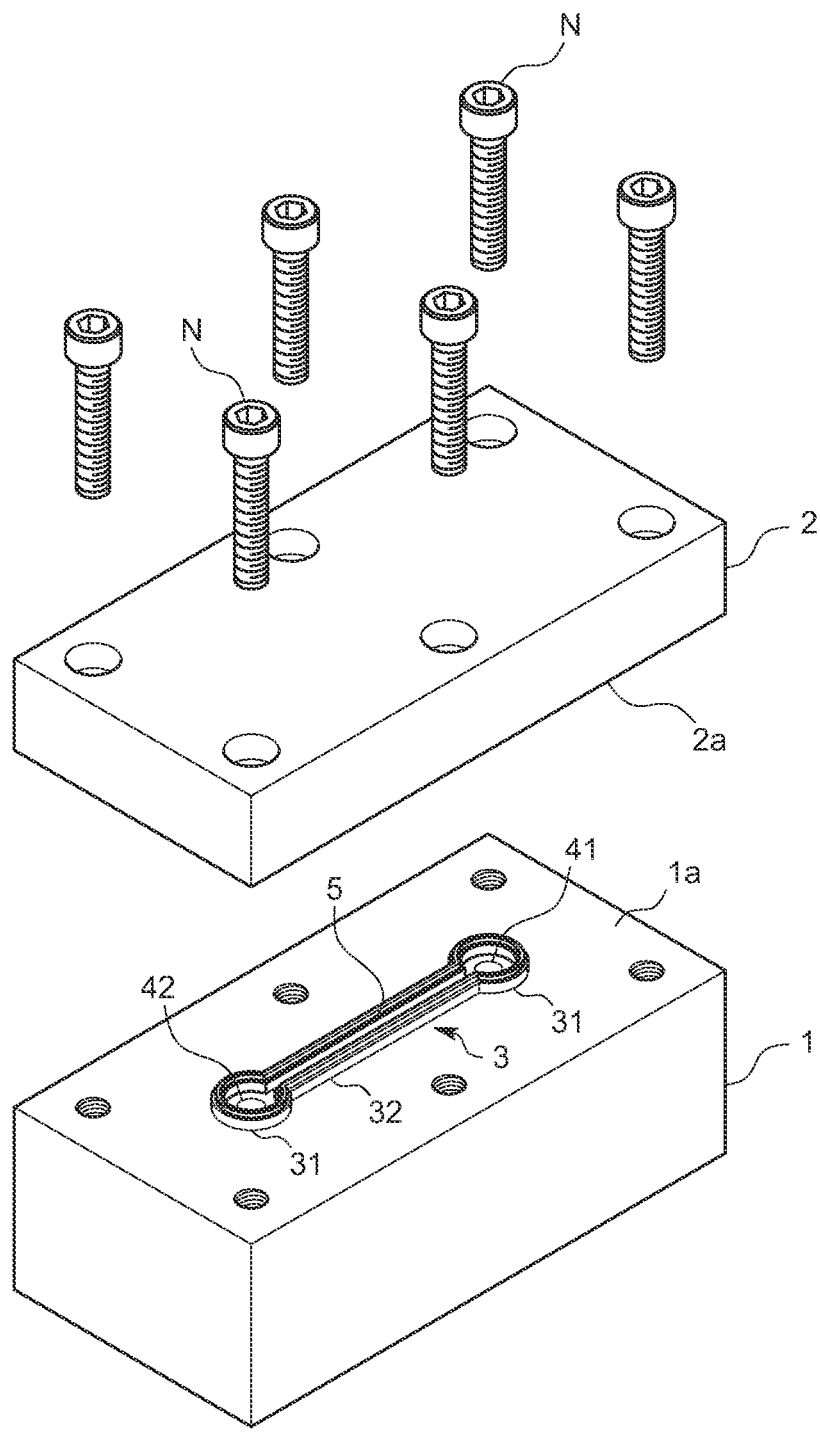
FIG. 2 is a pattern exploded perspective view of the fluid resistance device of this embodiment.

More concretely, the fluid resistance device 100 comprises, as shown in FIG. 2, a body member 1 and a cap member 2 as being two members, and a ring body 3.

The body member 1 is made of metal in a shape of a cuboid, and inside of which are formed the upstream side flow channel and the downstream side flow channel. Each of the flow channels has enough cross-sectional area so as not to be a substantial resistance for the fluid, and a downstream end 41 of the upstream side flow channel and an upstream end 42 of the downstream side flow channel open at different positions on a top surface 1a (a facing surface in the claim) of the body member 1.

The cap member 2 is made of metal in a shape of a flat plate that is mounted on the top surface 1a of the body member 1, and its outline shape in plane view coincides with that of the body member 1. The body member 1 and the cap member 2 are made of a material, for example, SUS316L that is superior in resistance to corrosion.

Figure 3:
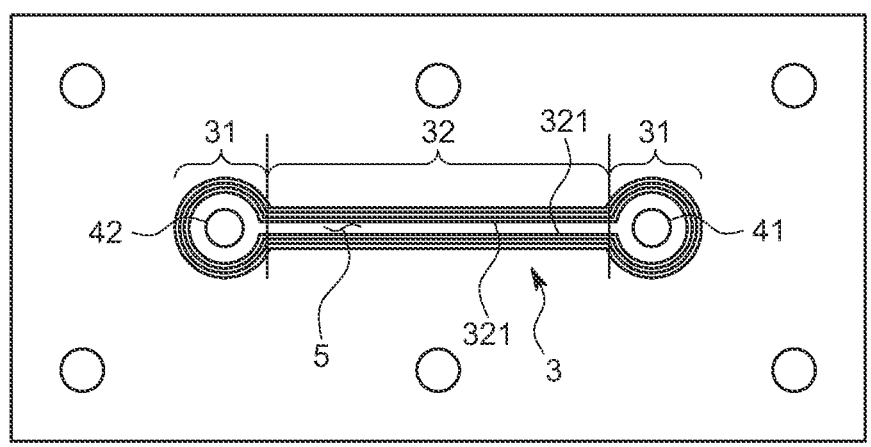
FIG. 3 is a plane view of a ring body of this embodiment.
Figure 4:
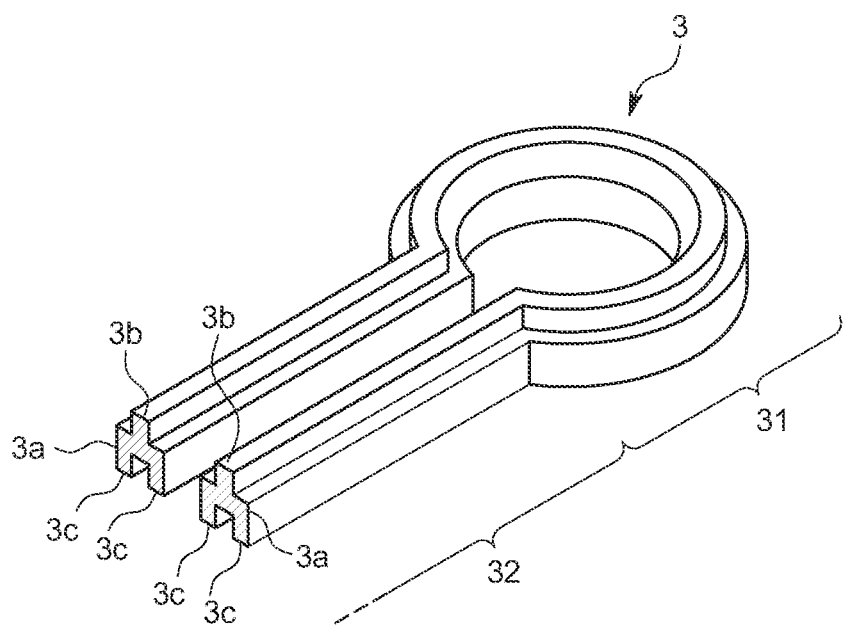
FIG. 4 is a partial perspective view of the ring body of this embodiment.

The ring body 3 is, as shown in FIG. 2-FIG. 4, made of metal that is held between a facing surface 1a of the body member 1 and a facing surface 2a of the cap member 2 (between the top surface 1a of the body member 1 and a bottom surface 2a of the cap member 2), and is arranged to surround the downstream end opening 41 and the upstream end opening 42.

More specifically, the ring body 3 comprises, as shown in FIG. 3, a pair of partial arc parts 31, 31 arranged at a circumference of each opening 41, 42 and a parallel elongating part 32 that is arranged between the partial arc parts 31, 31 with inside edge parts 321 that face each other elongating linearly in parallel and keeping an equal distance in plane view. An inner diameter of the partial arc part 31 is set to be bigger than a diameter of the opening 41, 42 so as to allow a positional displacement of the ring body 3 to the body member 1 to a certain degree.

Meanwhile, a transverse section, cut by a surface orthogonal to an elongating direction, of the ring body 3 is, as shown in FIG. 4 and FIGS. 5A and 5B, identical. Viewed from a transverse sectional direction, the ring body 3 comprises a center part 3a in a shape of a horizontally long rectangle, a first projecting part 3b that projects from a center of the center part 3a in a direction of the cap member 2, and a pair of second projecting parts 3c that project from each of the outer end part of the center part 3a in a direction of the body member 1. The ring body 3 is made of, for example, SUS 316LH that is harder than that of the body member 1 and the cap member 2.

Next, a method for assembling the fluid resistance device 100 will be explained.

First, as shown in FIG. 2, the ring body 3 is placed on the top surface of the body member 1. At this time, each partial arc part 31 of the ring body 3 is arranged on the circumference of the downstream end opening 41 and the circumference of the upstream end opening 42, respectively.

Next, as shown in FIG. 5A, the cap member 2 is placed on the body member 1 on which the ring body 3 is placed. Then a screw (N) is fastened from a peripheral part of the cap member 2 by a predetermined torque so as to push the cap member 2 against the body member 1 to approach the facing surface 2a of the cap member 2 to the facing surface 1a of the body member 1.

During this process, as shown in FIG. 5B, the first projecting part 3b breaks into the bottom surface (the facing surface) 2a of the cap member 2 and the second projecting part 3c breaks into the top surface (the facing surface) 1a of the body member 1 while the ring body 3 slightly rotates when viewed from the transversal cross-sectional surface direction. This is because the ring body 3 is made of the material that is harder than that of the cap member 2 and the body member 1.

Meanwhile, since the center part 3a of the ring body 3 rarely breaks into the facing surface 1a, 2a because the center part 3a is wider than the projecting part 3b, 3c, a gap is formed between the facing surface 1a and the facing surface 2a accurately by a length generally the same as the height of the center part 3a.

With this arrangement, as shown in FIG. 5B, a capillary as being a fluid resistance channel 5 having a length long enough compared with the transverse cross-sectional area is formed by being surrounded by the inside edge parts 321 of the parallel elongating part 32 of the ring body 3 and the facing surfaces 1a, 2a.

In accordance with this arrangement, it is possible to manufacture the fluid resistance device 100 extremely easily without complicated work such as welding just by placing the ring body 3 that is previously made by an etching forming or a die forming on a predetermined position of the top surface 1a of the body member 1 and mounting the cap member 2.

In addition, since a width of the fluid resistance channel 5 is specified by a distance between the inside edge parts 321, 321 of the ring body 3 and a height of the fluid resistance channel 5 is specified by a height of the center part 3a of the ring body 3, it is possible to reproduce the shape and the size of the fluid resistance channel 5 with high accuracy. Accordingly, it is possible to provide a fluid resistance device 100 having less dispersion of performance.

Furthermore, since the ring body 3 that forms the fluid resistance channel 5 also serves to function as a seal member by breaking into the facing surface 1a of the body member 1 and the facing surface 2a of the cap member 2, it is possible to reduce a number of components.

In addition, in this embodiment, since the second projecting part 3c breaks into the facing surface 1a with a slight inclination when viewed from the transverse cross-sectional direction, stress is applied not only just in a vertical direction but also in a lateral direction at a point where the second projecting part 3c breaks so that it is possible to seal the second projecting part 3c and the body member 1 securely.

If the body member 1 and the cap member 2 are used in common and only a type of the ring body 3 is changed, it is possible to manufacture the fluid resistance device 100 having various fluid resistance characteristics so that a product lineup can be assorted with ease.

The present claimed invention is not limited to the above-mentioned embodiment.

Figure 6A:
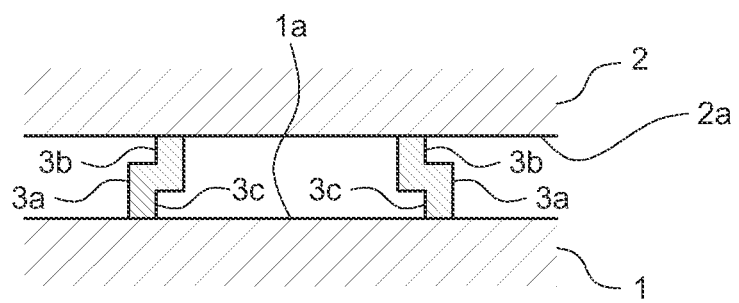
FIGS. 6A and 6B show explanatory views to explain an assembling procedure of a fluid resistance device viewed from a cross-sectional surface in accordance with the other embodiment of this invention.
Figure 6B:
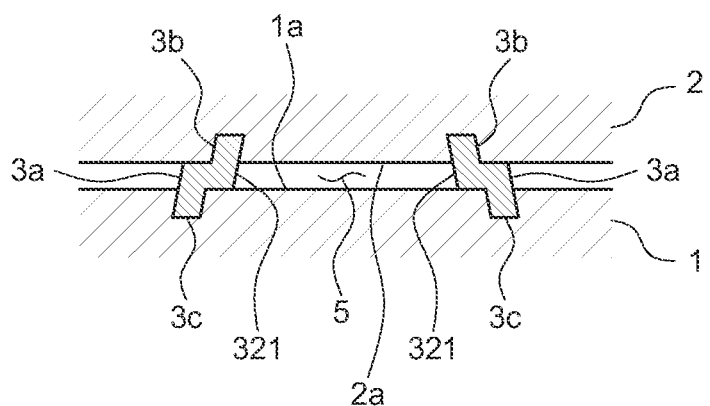

For example, a transverse cross-sectional shape of the ring body 3 may be formed so that the first projecting part 3b projects from the inside end part of the center part 3a and the second projecting part 3c projects from the outside end part of the center part 3a as shown in FIG. 6A. In accordance with this arrangement, as shown in FIG. 6B, the first projecting part 3b breaks into the facing surface 2a and the second projecting part 3c breaks into the facing surface 1a while the ring body 3 slightly rotates when viewed from the transversal cross-sectional surface direction. As mentioned, if the ring body 3 is formed into a vertically asymmetric shape when viewed from a transversal cross-sectional surface direction, a force is also applied by both the first projecting part 3b and the second projecting part 3c in a lateral direction. With this arrangement, since the ring body 3 is transformed in a lateral direction as shown in FIG. 6B, it is possible to securely seal the fluid resistor channel 5 formed by the inside edge parts 321, the facing surface 1a, and the facing surface 2a.

Figure 7:
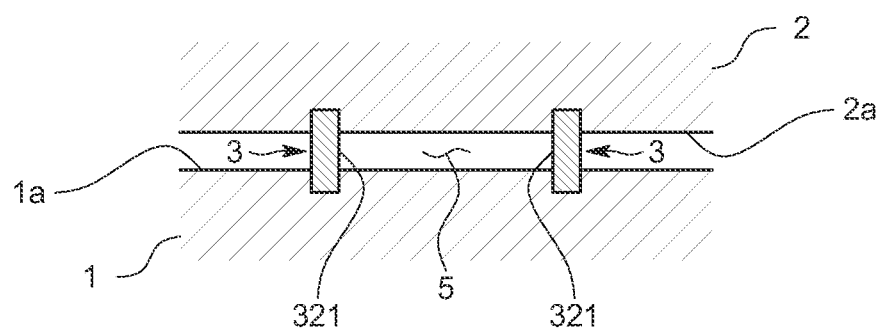
FIG. 7 is a transverse sectional view of a ring body in accordance with a further different embodiment of this invention.

In addition, the ring body 3 may be in a shape of a simple vertically long rectangle when viewed in a transverse cross-sectional shape as shown in FIG. 7. In this case, it is preferable to additionally provide a spacer that specifies a distance between the facing surface 1a and the facing surface 2a.

Figure 8:
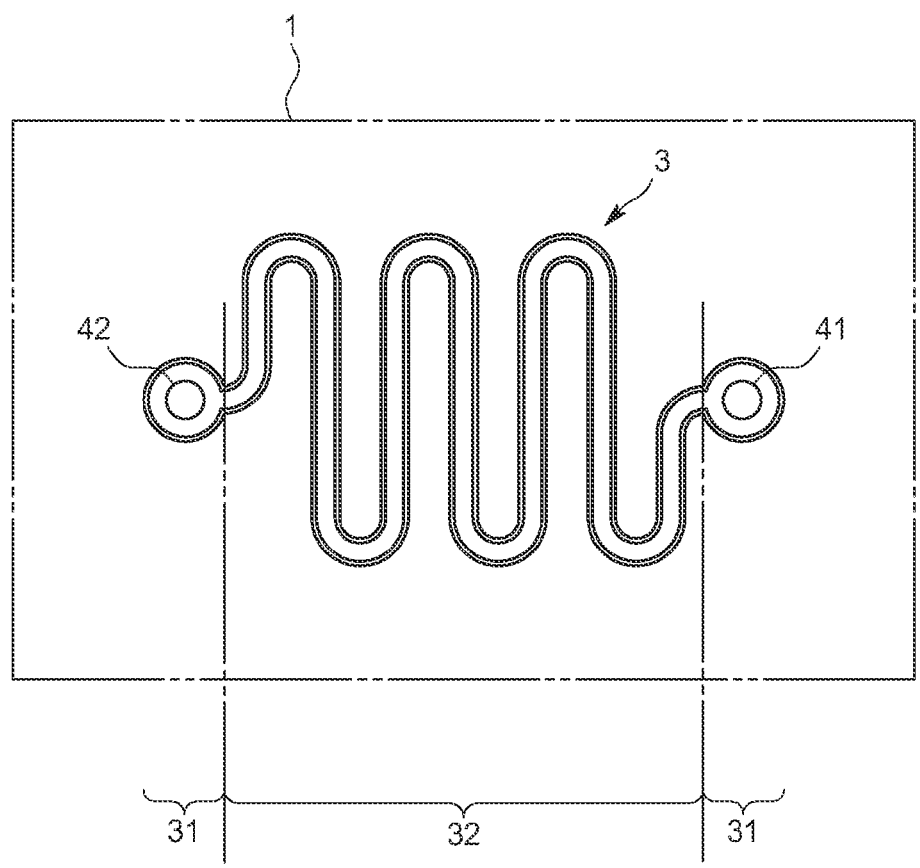
FIG. 8 is a plane view of a ring body in accordance with a further different embodiment of this invention.

The parallel elongating part 32 of the ring body 3 may be winding in a curved shape as shown in FIG. 8. In accordance with this arrangement, it is possible to elongate the length of the fluid resistance channel 5.

Figure 9:
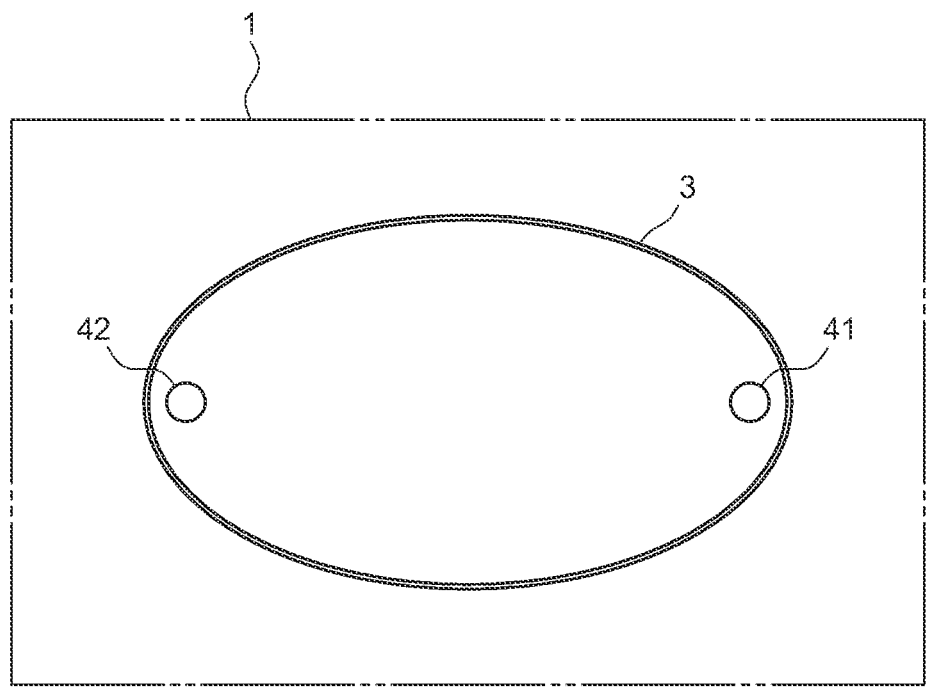
FIG. 9 is a plane view of a ring body in accordance with a further different embodiment of this invention.

The ring body 3 may be, for example, in a shape of an ellipse or a circle in a plane view, as shown in FIG. 9, without the parallel elongating part 32.

Similar to the above-mentioned embodiment, the upstream side flow channel and the downstream side flow channel are not necessarily arranged only on one of the members, for example, the upstream side flow channel may be arranged on one member and the downstream side flow channel may be arranged on the other member. In this case, the downstream end opening is arranged on a facing surface of one member and the upstream end opening is arranged on a facing surface of the other member.

Figure 10:
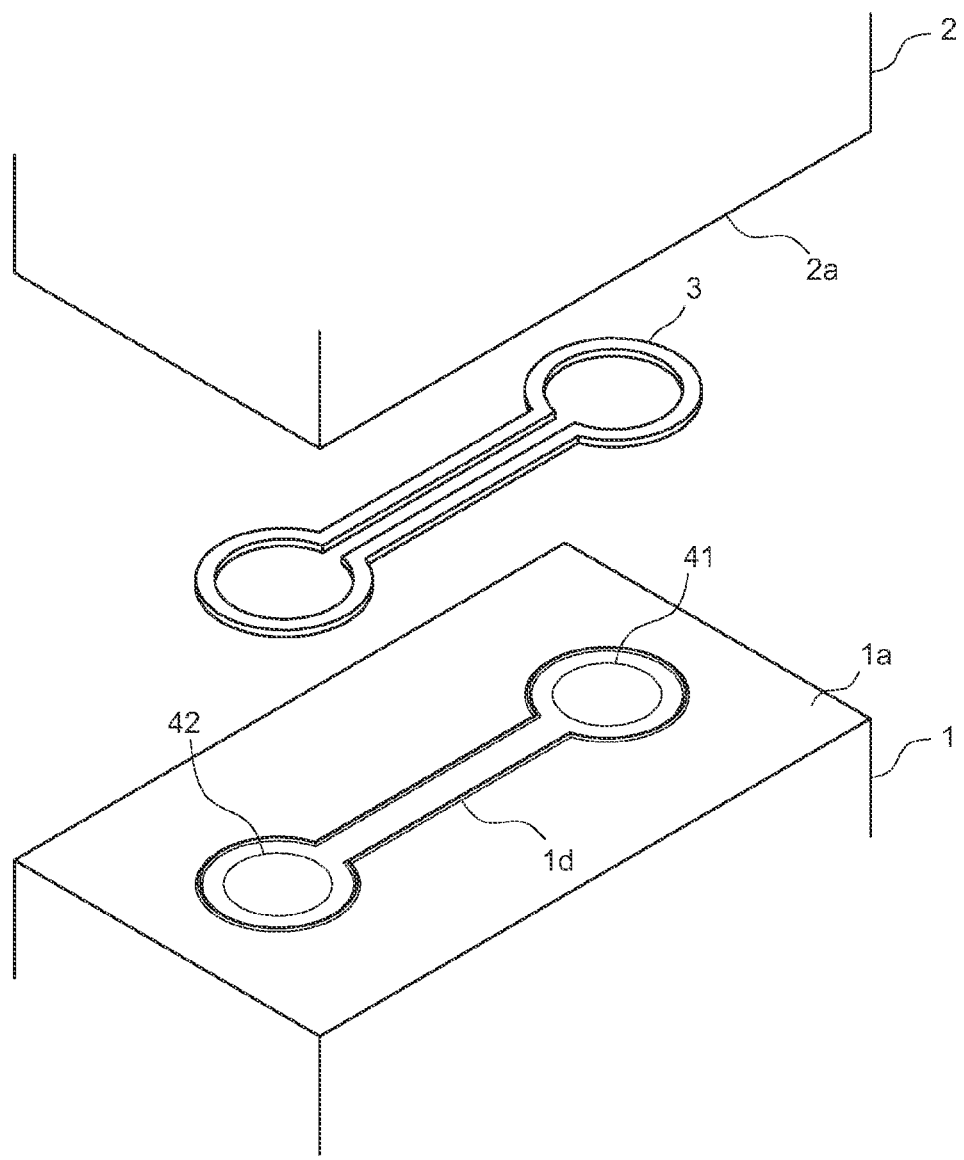
FIG. 10 is a pattern exploded perspective view of a fluid resistance device in accordance with a further different embodiment of this embodiment.
Figure 11A:
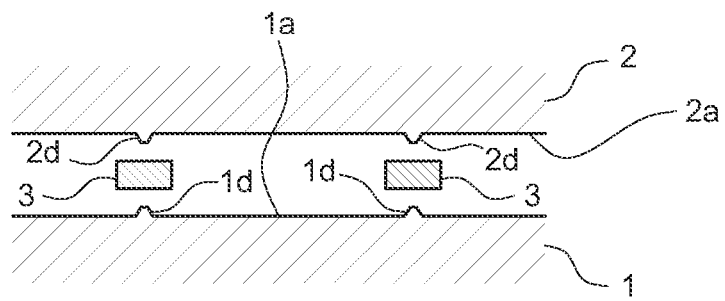
FIGS. 11A and 11B show explanatory views to explain an assembling procedure of a fluid resistance device viewed from a cross-sectional surface in accordance with this embodiment.
Figure 11B:
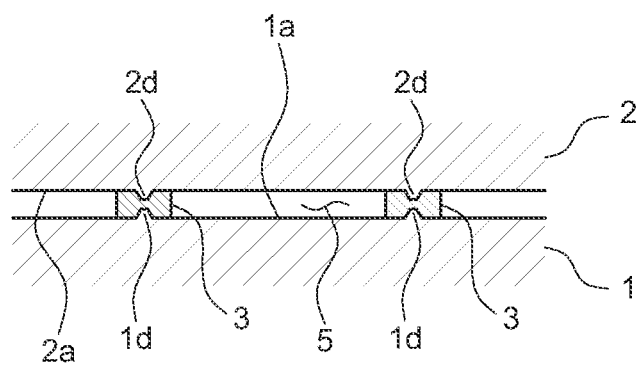

Furthermore, as shown in FIG. 10 and FIGS. 11A and 11B, the body member 1 and the cap member 2 may be made of a material harder than that of the ring body 3. In this case, a projection 1d is arranged on the facing surface 1a of the member 1 and a projection 2d is arranged on the facing surface 2a of the member 2 so that the projection 1d breaks into a back surface of the ring body 3 whose transverse cross-sectional view is flat and the projection 2d breaks into a front surface of the ring body 3 as shown in FIG. 11B.

In addition, the present claimed invention is not limited to the above-mentioned embodiment and may be variously modified without departing from a spirit of the invention.

EXPLANATION OF REFERENCE CHARACTERS

100 . . . fluid resistance device
1 . . . body member
2 . . . cap member
1a, 2a . . . facing surface
3 . . . ring body
3a . . . center part
3b . . . first projecting part
3c . . . second projecting part
32 . . . parallel elongating part
41 . . . downstream end opening
42 . . . upstream end opening
5 . . . fluid resistance channel

The invention claimed is:

1. A fluid resistance device where an upstream side flow channel, a downstream side flow channel and a fluid resistance channel that connects these flow channels are formed, comprising
    two members that have facing surfaces that face each other and a downstream end of the upstream side flow channel and an upstream end of the downstream side flow channel open respectively at a downstream end opening and an upstream end opening at positions displaced from each other on the facing surfaces, and
    a ring body that is arranged to surround the downstream end opening and the upstream end opening and that forms the fluid resistance channel between the downstream end opening and the upstream end opening by being sandwiched by the facing surfaces, wherein
    the ring body is made of a material harder than that of each member, the ring body comprises a center member and a first projecting part that projects from a part of a surface facing one of the facing surfaces on the center member, and the first projecting part is so configured to break into the facing surfaces by fastening the two members so as to make the facing surfaces approach each other.

2. The fluid resistance device described in claim 1, wherein both the downstream end opening and the upstream end opening are formed on the facing surface of one of the members.

3. The fluid resistance device described in claim 1, wherein between the downstream end opening and the upstream end opening, a parallel elongating part is formed wherein inside edge parts of the ring body that face each other elongate in parallel with keeping an equal distance, and the fluid resistance channel whose length is longer than a transverse cross-sectional area is formed on the parallel elongating part.

4. The fluid resistance device described in claim 1, wherein the ring body further comprises a second projecting part that projects from a part of a surface facing the other facing surface on the center member.

5. The fluid resistance device described in claim 4, wherein the first projecting part projects from an inner end part of the center member and the second projecting part projects from an outer end part of the center member.

6. The fluid resistance device described in claim 4, wherein the first projecting part projects from a center part of the center member and a pair of the second projecting parts project from an inner end part and an outer end part of the center member respectively.

7. A fluid resistance device where an upstream side flow channel, a downstream side flow channel and a fluid resistance channel that connects these flow channels are formed, comprising
    two members that have facing surfaces that face each other and a downstream end of the upstream side flow channel and an upstream end of the downstream side flow channel respectively open at a downstream end opening and an upstream end opening at positions displaced from each other on the facing surfaces, and
    a ring body that is arranged to surround the downstream end opening and the upstream end opening and that forms the fluid resistance channel between the downstream end opening and the upstream end opening by being sandwiched by the facing surfaces, wherein
    each member is made of a material harder than that of the ring body, and a ring-shaped projection is formed for each of the facing surfaces and each projection is so configured to break into a front surface and a back surface of the ring body by fastening two members so as to make the facing surfaces approach each other.

* * * * *